US011269362B2

(12) United States Patent
Hirata et al.

(10) Patent No.: US 11,269,362 B2
(45) Date of Patent: Mar. 8, 2022

(54) FLOW RATE CONTROL METHOD AND FLOW RATE CONTROL DEVICE

(71) Applicant: FUJIKIN INCORPORATED, Osaka (JP)

(72) Inventors: Kaoru Hirata, Osaka (JP); Shinya Ogawa, Osaka (JP); Katsuyuki Sugita, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/047,552

(22) PCT Filed: Apr. 19, 2019

(86) PCT No.: PCT/JP2019/016763
§ 371 (c)(1),
(2) Date: Oct. 14, 2020

(87) PCT Pub. No.: WO2019/208417
PCT Pub. Date: Oct. 31, 2019

(65) Prior Publication Data
US 2021/0157341 A1 May 27, 2021

(30) Foreign Application Priority Data
Apr. 27, 2018 (JP) .............................. JP2018-086546

(51) Int. Cl.
*F16K 31/02* (2006.01)
*G05D 7/06* (2006.01)
(Continued)

(52) U.S. Cl.
CPC .......... *G05D 7/0647* (2013.01); *F16K 31/004* (2013.01); *G01F 1/34* (2013.01); *G01F 15/005* (2013.01); *G05D 7/06* (2013.01)

(58) Field of Classification Search
CPC ...... G05D 7/0647; G05D 7/06; F16K 31/004; G01F 1/34; G01F 15/005
(Continued)

(56) References Cited

U.S. PATENT DOCUMENTS 6,152,168 A * 11/2000 Ohmi .................. G05D 7/0647
137/487.5
6,964,279 B2 * 11/2005 Ohmi .................. G05D 7/0635
137/487.5
(Continued)

FOREIGN PATENT DOCUMENTS

JP   2007-192269 A   8/2007
JP       4933936 B2   5/2012
(Continued)

OTHER PUBLICATIONS

International Search Report issued in PCT/JP2019/016763; dated Jul. 16, 2019.

*Primary Examiner* — Minh Q Le
(74) *Attorney, Agent, or Firm* — Studebaker & Brackett PC (57) ABSTRACT

A flow rate control method performed using a flow rate control device 100 comprising a first control valve 6 provided in a flow path, a second control valve 8 provided downstream of the first control valve, and a pressure sensor 3 for measuring fluid pressure downstream of the first control valve, the method comprising steps of: (a) closing the opening of the first control valve from a state in which, while controlling the opening of the first control valve based on an output of the pressure sensor so as to be the first flow rate, maintaining the opening of the second control valve in an open state, and flowing a fluid at the first flow rate; and (b) based on the output of the pressure sensor, the pressure remaining downstream of the first control valve is controlled (Continued)

by adjusting the opening of the second control valve, and flowing the fluid at the second flow rate downstream of the second control valve.

17 Claims, 3 Drawing Sheets

(51) Int. Cl.
  *G01F 15/00* (2006.01)
  *G01F 1/34* (2006.01)
  *F16K 31/00* (2006.01)

(58) Field of Classification Search
  USPC .............. 137/12, 487.5; 156/345.15, 345.24, 156/345.26; 118/715
  See application file for complete search history.

(56) References Cited

U.S. PATENT DOCUMENTS

| | | | | |
|---|---|---|---|---|
| 8,240,324 | B2* | 8/2012 | Monkowski | G01F 25/0053 137/12 |
| 8,794,261 | B2* | 8/2014 | Watanabe | F17D 3/00 137/486 |
| 9,383,758 | B2* | 7/2016 | Ohmi | G05D 7/0641 |
| 2003/0183279 | A1 | 10/2003 | Chang | |
| 2004/0244837 | A1* | 12/2004 | Nawata | G05D 7/0647 137/487.5 |
| 2010/0127196 | A1 | 5/2010 | Sawada et al. | |
| 2010/0294964 | A1 | 11/2010 | Matsumoto et al. | |
| 2012/0073672 | A1* | 3/2012 | Ding | C23C 16/45523 137/14 |
| 2014/0373935 | A1* | 12/2014 | Nishino | G05D 7/0641 137/102 |
| 2015/0114499 | A1* | 4/2015 | Dohi | F16K 31/52491 137/613 |
| 2015/0136248 | A1 | 5/2015 | Nagase et al. | |
| 2016/0239026 | A1 | 8/2016 | Nagase et al. | |
| 2019/0137309 | A1 | 5/2019 | Sawada et al. | |
| 2019/0178389 | A1 | 6/2019 | Sawada et al. | |
| 2020/0232873 | A1* | 7/2020 | Nagase | G05B 23/02 |
| 2020/0348704 | A1* | 11/2020 | Sugita | G05D 7/0647 |
| 2021/0240208 | A1* | 8/2021 | Hirata | G05D 16/2033 |
| 2021/0310844 | A1* | 10/2021 | Nagase | G05D 7/06 |

FOREIGN PATENT DOCUMENTS

| | | |
|---|---|---|
| KR | 10-2002-0055352 A | 7/2002 |
| KR | 10-2016-0043060 A | 4/2016 |
| WO | 2013/179550 A1 | 12/2013 |
| WO | 2018/008420 A1 | 1/2018 |
| WO | 2018/021277 A1 | 2/2018 |

* cited by examiner

FLOW RATE CONTROL METHOD AND FLOW RATE CONTROL DEVICE

TECHNICAL FIELD

The present invention relates to a flow rate control method and a flow rate control device, and more particularly, to a flow rate control method and a flow rate control device suitably used in a semiconductor manufacturing equipment, a chemical plant, or the like.

BACKGROUND OF INVENTION

In semiconductor manufacturing equipment and chemical plants, various types of flowmeters and flow rate control devices are used to control the flow of fluids such as material gas and etching gas. Among them, the pressure-type flow rate control device is widely used because it is possible to control the flow rate of various fluids with high accuracy by a relatively simple mechanism, which is a combination of a control valve and a restriction part (for example, an orifice plate). Further, the pressure-type flow rate control device has an excellent flow rate control characteristic that stable flow rate control can be achieved even if the primary supply pressure fluctuates greatly.

As the control valve used in the pressure-type flow rate control device, a piezoelectric element driven valve for opening/closing a metal diaphragm valve element by a piezoelectric element driven device (hereinafter, sometimes referred to as a piezo actuator) is used. Patent Document 1 discloses a pressure type flow rate control device, and Patent Document 2 discloses a normally open type piezoelectric element driven valve used as the control valve.

PRIOR ART LITERATURE

Patent Literature

Patent Document 1: Japanese Laid-Open Patent Publication No. 2007-192269
Patent Document 2: Japanese Patent No. 4933936
Patent Document 3: International Publication No. 2018/021277
Patent Document 4: International Publication No. 2018/008420
Patent Document 5: International Publication No. 2013/179550

SUMMARY OF INVENTION

Problems to be Solved by Invention

A pressure-type flow rate control device is configured to adjust the flow rate by controlling a fluid pressure upstream of the restriction part (hereinafter, sometimes referred to as upstream pressure). The upstream pressure can be controlled by adjusting the opening degree of a control valve provided upstream of the restriction part, and the fluid can be flowed at a desired flow rate by matching the upstream pressure to a pressure corresponding to the desired flow rate using the control valve.

However, there is a problem that in the pressure-type flow rate control device, since the restriction part such as an orifice plate having a fine opening is used, it is difficult to increase the responsiveness when shifting from a high set flow rate to a low set flow rate, i.e. the flow rate step down. The main reason why it cannot improve the responsiveness at the time of step-down is that, it is difficult to rapidly reduce the upstream pressure and flow rate even if the control valve closes, because the gas between the control valve and the restriction part is continued to flow out through the restriction part.

As a countermeasure to the responsiveness in such a flow rate step-down, it is conceivable to reduce the flow path volume between the control valve and the restriction part as much as possible. However, since the pressure-type flow rate control device controls the fluid pressure between the control valve and the restriction part based on the output of a pressure sensor or the like, there is also a limit to reduce the volume of the flow path described above. Therefore, particularly when performing the flow rate control in a small flow rate range, in which the aperture diameter of the restriction part is small, also sufficient step-down responsiveness cannot be obtained, using a conventional control method, it may take more than 2 seconds when reducing from 100% flow rate to 5% flow rate.

The present invention has been made in view of the above-mentioned problems, and its main object is to provide a flow rate control method and a flow rate control device capable of improving the responsiveness particularly at the time of flow rate step-down.

Means for Solving Problem

The flow rate control method according to an embodiment of the present invention is performed by using a flow rate control device comprising: a first control valve provided in a flow path, a second control valve provided downstream of the first control valve, and a pressure sensor for measuring the fluid pressure downstream of the first control valve and upstream of the second control valve, the flow rate control device being configured to control the flow rate of a fluid flowing to the downstream of the second control valve, based on a signal output by the pressure sensor, and including the steps of (a) while controlling the opening degree of the first control valve so that the flow rate become a first flow rate based on the output of the pressure sensor, keeping the second control valve open, flowing a fluid at the first flow rate, then closing the first control valve from this state; (b) on the basis of the output of the pressure sensor, controlling the pressure remaining downstream of the first control valve by adjusting the opening degree of the second control valve, and flowing the fluid at a second flow rate downstream of the second control valve.

In an embodiment, in the step (b), when $\alpha$ is the proportional constant, $\Delta P/\Delta t$ is the pressure change rate, i.e. the ratio of the change $\Delta P$ of the upstream pressure output from the pressure sensor and the time $\Delta t$ is time required for the change $\Delta P$ of the upstream pressure, V is the internal volume between the first control valve and the second control valve, in order to match the builddown flow rate Q represented by $Q=\alpha \cdot (\Delta P/\Delta t) \cdot V$ to the second flow rate, based on the signal output from the pressure sensor, the opening of the second control valve is feedback controlled.

In an embodiment, the flow rate control method further includes a step (c) of flowing fluid downstream at the second flow rate by controlling the opening of the first control valve based on the output of the pressure sensor, at a time point when the output of the pressure sensor falling to a predetermined value, after performing the step (b).

In an embodiment, the second control valve is fully opened when the fluid is flowing at the first flow rate in the step (a), and when the fluid is flowing at the second flow rate by controlling the opening degree of the first control valve in the step (c).

In an embodiment, in the step (a), the first control valve is closed at an opening that is smaller than the opening when the opening of the first control valve is controlled to be the second flow rate, based on the output of the pressure sensor.

In an embodiment, the timing of closing the first control valve in the step (a) and the timing of starting the adjustment of the opening degree of the second control valve in the step (b) are synchronized.

The flow rate control device according to an embodiment of the present invention includes a first control valve provided in a flow path, a second control valve provided downstream of the first control valve, a pressure sensor for measuring the fluid pressure downstream of the first control valve and upstream of the second control valve, and a control circuit for controlling the operation of the first control valve and the second control valve, the control circuit being configured to control the flow rate by controlling the first control valve based on a signal output from the pressure sensor, and to perform the steps of: (a) while controlling the opening of the first control valve so that the flow rate become a first flow rate based on the output of the pressure sensor, and keeping the second control valve open, flowing a fluid at the first flow rate, then closing the first control valve from this state; (b) on the basis of the output of the pressure sensor, controlling the pressure remaining downstream of the first control valve by adjusting the opening degree of the second control valve, and flowing the fluid at a second flow rate downstream of the second control valve.

In an embodiment, the second control valve is a normally open type valve.

In an embodiment, the flow rate control device further comprises another pressure sensor provided downstream of the second control valve.

The flow rate control device according to an embodiment of the present invention includes a first control valve provided in a flow path, a second control valve provided downstream of the first control valve, and a pressure sensor for measuring the fluid pressure downstream of the first control valve and upstream of the second control valve, the flow rate control device controls the flow rate of the downstream side based on a signal output from the pressure sensor, when controlling the flow rate from the first flow rate to a second flow rate smaller than the first flow rate, while closing the first control valve, controls the opening degree of the second control valve based on the output of the pressure sensor, the opening degree of the second control valve is controlled to match the rate of change of the pressure remaining downstream of the first control valve to the rate of change of the flow rate when flowing out from the second control valve becomes the second flow rate.

In an embodiment, when controlling the flow rate from the first flow rate to the second flow rate, the first control valve is controlled to an opening degree smaller than the opening degree corresponding to the second flow rate.

In an embodiment, when $\alpha$ is a proportional constant, $\Delta P/\Delta t$ is the pressure change rate of the ratio between the change $\Delta P$ of the upstream pressure output by the pressure sensor and the time $\Delta t$ required for the pressure change $\Delta P$, V is an internal volume between the first control valve and the second control valve, the opening of the second control valve is controlled to an opening degree capable of maintaining $\Delta P/\Delta t$ when the flow rate Q represented by $Q=\alpha\cdot(\Delta P/\Delta t)\cdot V$ reaches the second flow rate.

In an embodiment, the flow rate control device further comprises another pressure sensor provided downstream of the second control valve.

The flow rate control device according to an embodiment of the present invention is a flow rate control device comprising a first control valve provided in a flow path, a second control valve provided downstream of the first control valve, and a first pressure sensor measuring a fluid pressure downstream of the first control valve and upstream of the second control valve, the flow rate control device controlling the downstream flow rate based on a signal output from the pressure sensor, when controlling the flow rate from a first flow rate to a second flow rate that is smaller than the first flow rate, changing the flow rate controlled by $Q=K_1\cdot P1$ to a flow rate controlled by $Q=\alpha\cdot(\Delta P/\Delta t)\cdot V$, and when the pressure of the first pressure sensor reaches a predetermined pressure, returning to the flow rate controlled by $Q=K_1\cdot P1$, here, Q is a flow rate, $K_1$ is a constant depending on the type and temperature of the fluid, P1 is a constant depending on the type and temperature of the fluid, and P1 is an upstream pressure sensor output by the first pressure sensor, $\alpha$ is a proportional constant, $\Delta P/\Delta t$ is a pressure change rate of the upstream pressure, V is an internal volume between the first control valve and the second control valve.

In an embodiment, when the pressure of the first pressure sensor reaches the pressure corresponding to the second flow rate controlled by $Q=K_1\cdot P1$, the control by $Q=\alpha\cdot(\Delta P/\Delta t)\cdot V$ is returned to the control by $Q=K_1\cdot P1$.

The flow rate control device according to an embodiment of the present invention includes a first control valve provided in a flow path, a second control valve provided downstream of the first control valve, a first pressure sensor for measuring the fluid pressure downstream of the first control valve and upstream of the second control valve, and a second pressure sensor for measuring the fluid pressure downstream of the second control valve, the flow rate control device controls the downstream flow rate based on signals output by the first and second pressure sensors, when controlling the flow rate from the first flow rate to the second flow rate smaller than the first flow rate, changes the flow rate control from the control by $Q=K_2\cdot P2^m(P1-P2)^n$ to the control by $Q=\alpha\cdot(\Delta P/\Delta t)\cdot V$, and when the pressures of the first pressure sensor and second pressure sensor reach to predetermined pressures, returns to the control by $Q=K_2\cdot P2^m(P1-P2)^n$, where Q is the flow rate, $K_2$ is a constant depending on the type and temperature of the fluid, P1 is the upstream pressure output by the first pressure sensor, P2 is the downstream pressure output by the second pressure sensor, m and n are indexes derived based on the actual flow rate, $\alpha$ is a proportional constant, $\Delta P/\Delta t$ is the pressure change rate of the upstream pressure, V is the internal volume between the first control valve and the second control valve.

In an embodiment, when pressures of the first and second pressure sensor reach the pressure corresponding to the second flow rate in the control by $Q=K_2\cdot P2^m(P1-P2)^n$, the control is returned from the control of $Q=\alpha\cdot(\Delta P/\Delta t)\cdot V$ to the control by $Q=K_2\cdot P2^m(P1-P2)^n$.

Further, in an embodiment, the flow rate control device may be provided with both the first control valve and the second control valve having adjustable opening degrees, and the restriction part provided downstream of the first control valve having a fixed opening degree. The restriction part and the second control valve may be provided integrally, and may constitute a valve with a built-in orifice. Further, when reducing the flow rate from the first flow rate to the second flow rate smaller than the first flow rate, in the above step (a), while closing the first control valve to an opening smaller than the opening corresponding to the second flow rate, in step (b), in conjunction with the operation of closing the first control valve, while maintaining the opening of the first control valve in a closed state, the opening of the second control valve may be controlled based on the output of the pressure sensor.

Effect of Invention

According to the embodiments of the present invention, a flow rate control method and a flow rate control device capable of improving responsiveness when reducing flow rate is provided.

DETAILED DESCRIPTION OF INVENTION

Hereinafter, embodiments of the present invention will be described with reference to the drawings, but the present invention is not limited to the embodiments described below.

Figure 1:
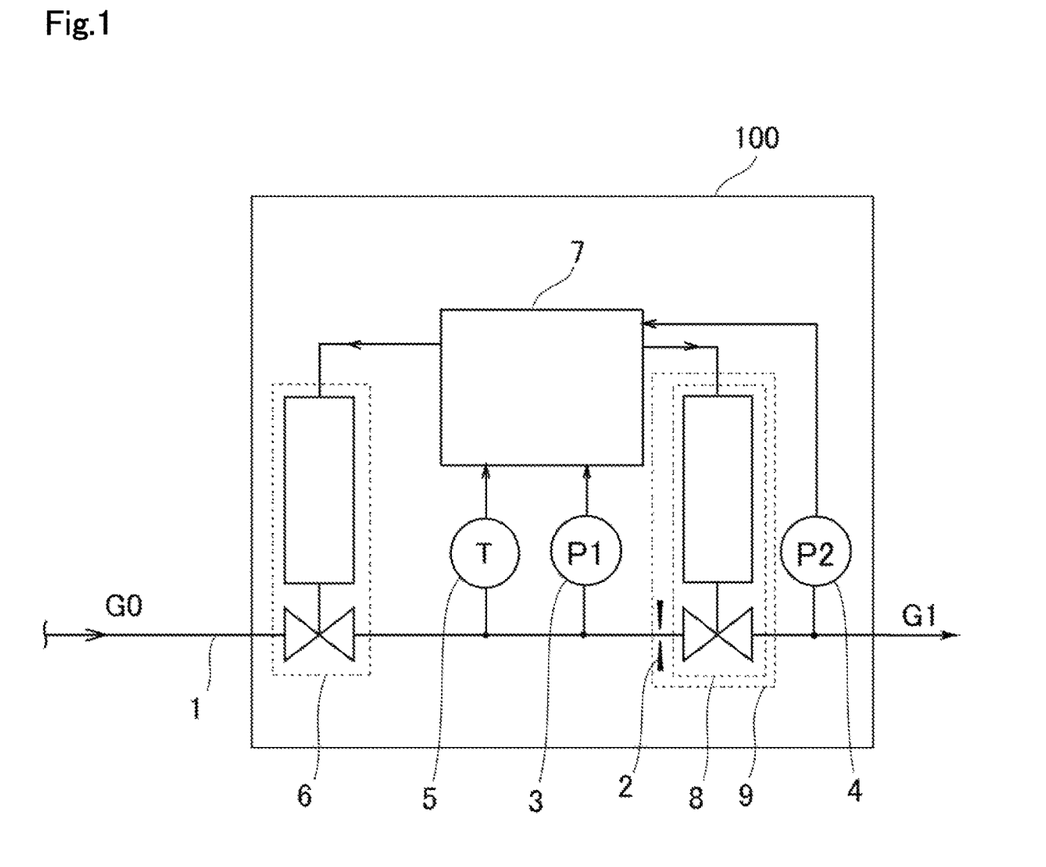
FIG. 1 is a schematic diagram showing a configuration of a flow rate control device according to an embodiment of the present invention.

FIG. 1 shows a configuration of a flow rate control device 100 for performing the flow rate control method according to an embodiment of the present invention. The flow rate control device 100 includes a first control valve 6 provided in a flow path 1 of a gas G0 supplied from a gas supply source (not shown), a restriction part 2 provided downstream of the first control valve 6, a second control valve 8 provided downstream of the first control valve 6 and the restriction part 2, a first (or upstream) pressure sensor 3 and a temperature sensor 5 for detecting the pressure (upstream pressure P1) and the gas temperature T of the gas between the first control valve 6 and the restriction part 2.

The flow rate control device 100 of the present embodiment also includes a second (or downstream) pressure sensor 4 for measuring the downstream pressure P2 of the downstream side of the second control valve 8. The first pressure sensor 3 can measure the upstream pressure P1, which is the fluid pressure between the first control valve 6 and the restriction part 2, and the second pressure sensor 4 can measure the downstream pressure P2, which is the pressure downstream of the second control valve 8. However, in other embodiments, the flow rate control device 100 may not include the second pressure sensor 4 and the temperature sensor 5.

Further, as will be described later, the restriction part 2 and the second control valve 8 are integrally formed as the orifice built-in valve 9, and the restriction part 2 and the valve element of the second control valve 8 may be disposed close to each other. In this case, unlike the above-described embodiment, the restriction part 2 may be disposed downstream of the second control valve 8. Further, when the restriction part 2 is disposed downstream of the second control valve 8, the first pressure sensor 3 measures the upstream pressure P1, which is the fluid pressure between the first control valve 6 and the second control valve 8. The first pressure sensor 3 may be disposed so as to detect the fluid pressure downstream of the first control valve 6 and upstream of the second control valve 8, and may be configured to measure the fluid pressure between the first control valve 6 and the restriction part 2, or may be configured to measure the fluid pressure between the first control valve 6 and the second control valve 8.

The flow rate controller 100 further includes a control circuit 7 connected to the first control valve 6 and the second control valve 8. The control circuit 7 is configured to control the flow rate by controlling the opening degree of the first control valve 6 based on the signal output by the first pressure sensor 3, and to control the flow rate by controlling the opening degree of the second control valve 8 based on the signal output by the first pressure sensor 3 at the time of the flow rate step down. In the illustrated embodiment, the control circuit 7 is provided in common to connect both the first control valve 6 and the second control valve 8, but the present invention is not limited thereto, and it is needless to say that a control circuit may be provided for each of the first control valve 6 and the second control valve 8 separately.

The control circuit 7 may be incorporated in the flow rate control device 100 or may be provided outside the flow rate control device 100. The control circuits 7 typically includes CPUs, memories M such as ROMs and RAMs, A/D converters, and the like, and may include computer programs configured to execute flow rate control operations described later. The control circuit 7 can be realized by a combination of hardware and software.

The control circuit 7 may be provided with an interface for exchanging information with an external device such as a computer, so that programs and data can be written from the external device to the ROM. All elements of the control circuit 7 (such as the CPU) need not be integrally provided in the device, and some components, such as the CPU, may be disposed in another place (outside the device) and connected to each other by a bus. At this time, the inside of the device and the outside of the device may communicate not only by wire but also wirelessly.

The downstream side of the flow rate controller 100 is connected to a process chamber of, for example, a semiconductor manufacturing equipment, via a downstream valve (not shown). A vacuum pump is connected to the process chamber, and typically, a gas G1, whose flow rate is controlled, is supplied from the flow rate control device 100 to the process chamber in a state where the inside of the process chamber is evacuated. As the above-described downstream valve, for example, an on-off valve whose opening and closing operation is controlled by compressed air, such as a known air driven valve (Air Operated Valve) or a solenoid valve, can be used.

In the present embodiment, the restriction part 2 is constituted by an orifice plate. Since the orifice plate has a fixed orifice cross-sectional area, the orifice plate functions as a restriction part with a fixed degree of opening (Note that although the orifice cross-sectional area may vary unintentionally due to the occurrence of clogging or aging of the orifice, in this specification, a restriction part, which is not intentionally configured to control the degree of opening, is referred to as a restriction part with a fixed degree of opening). In this specification, "restriction part" means a portion in which the cross-sectional area of the flow path is limited to be smaller than the flow path cross-sectional area of the front and rear, for example, an orifice plate or a critical nozzle, a sonic nozzle, although it is configured using a slit structure or the like, other things can also be used. The diameter of the orifice or nozzle is set, for example, from 10 µm to 500 µm.

As the first control valve 6 and the second control valve 8, a valve with adjustable opening degree is used, for example, a known piezoelectric element driven valve for opening/closing a metal diaphragm valve element using a piezo actuator is used. The piezoelectric element-driven valve is configured to be capable of changing the opening degree in accordance with the driving voltage to the piezoelectric element, and can be adjusted to an arbitrary opening by control of the driving voltage.

In the flow rate control device 100, the opening degree of the first control valve 6 is controlled on the basis of the output from the first pressure sensor 3 by the control circuit 7, and the first control valve is feedback controlled so as the upstream pressure P1 output from the first pressure sensor 3 is maintained at the input set value. The first control valve 6 is used as the main valve or main flow rate control valve. Here a normally closed valve is used as the first control valve 6. However, a normally open valve may also be used as the first control valve 6.

On the other hand, the second control valve 8 is intended to be mainly used when the flow rate is stepping down from a high flow rate to a low flow rate, and has a function as the step-down flow rate control valve. Here, the step-down flow rate control style means the so-called builddown type flow rate control. The second control valve 8 is fully open except when performing the step-down of the flow rate, or at least it is maintained at an opening degree having an opening cross-sectional area larger than the opening area of the restriction part 2. The second control valve 8 may be either normally closed or normally open type, if using a normally open type valve, low power consumption can be realized because it is not necessary to apply a drive voltage during periods other than the flow rate step-down period. The second control valve 8 is preferably designed in such a way that it does not restrict the flow downstream of the restriction part 2 when it is fully open.

Further, as described above, in the present embodiment, the second control valve 8 and the restriction part 2 are integrally formed, and these constitute the orifice built-in valve 9. The orifice built-in valve 9 is described in, for example, Patent Document 3, and the orifice built-in valve having the same configuration can be used in the present embodiment. In the orifice built-in valve 9, the valve element of the second control valve 8 and the orifice plate as the restriction part 2 are disposed close to each other, and the flow path volume between them may be regarded as approximately 0. Therefore, if using the orifice built-in valve 9, it is possible to improve the characteristics of the rise and fall of the flow rate. Further, when using the orifice built-in valve 9, the internal volume V between the first control valve 6 and the second control valve 8 can be considered to be equivalent to the internal volume between the first control valve 6 and the orifice plate. Therefore, as will be described later, when performing the flow rate control using the above-mentioned internal volume V, there is an advantage that the approximate internal volume V can be easily obtained with relatively high accuracy.

As described above, either of the restriction part 2 (here, the orifice plate) or the second control valve 8 may be provided on the upstream side, but it is desired that the volume between the restriction part 2 and the second control valve 8 (here, the space surrounded by the orifice plate, the diaphragm valve element and the seat portion of the second control valve 8) be made as small as possible.

In the normal flow rate control mode, when the critical expansion condition P1/P2≥ about 2 (in the case of argon gas) is satisfied, the flow rate controller 100 described above performing the flow rate control by utilizing the principle that the flow rate is determined by the upstream pressure P1. When the critical expansion condition is satisfied, the flow rate Q downstream of the restriction part 2 is given by $Q=K_1 \cdot P1$, where $K_1$ is a constant depending on the type of the fluid and the fluid temperature, and the flow rate Q is proportional to the upstream pressure P1. Further, when provided with the second pressure sensor 4, the difference between the upstream pressure P1 and the downstream pressure P2 is small, so the flow rate can be determine by calculation even when the above critical expansion condition is not satisfied, based on the upstream pressure P1 and downstream pressure P2 measured by the first pressure sensor 3 and the second pressure sensor 4, the flow rate Q can be determined by $Q=K_2 \cdot P2^m(P1-P2)^n$ (where $K_2$ is a constant depending on the type of the fluid and the fluid temperature, m and n are indexes derived from the actual flow rate).

When the set flow rate signal is sent from the external control device or the like to the control circuit 7, based on the output of the first pressure sensor 3, the control circuit 7 calculates the flow rate using the flow rate calculation formula in the critical expansion condition or non-critical expansion condition above $Q=K_1 \cdot P1$ or $Q=K_2 \cdot P2^m(P1-P2)^n$. Then it feedback controls the first control valve 6 so that the flow rate of the fluid passing through the restriction part 2 approaches the set flow rate (i.e., the difference between the calculated flow rate and the set flow rate approaches 0). The calculated flow rate may be displayed on a display device, for example, as a control flow rate output value.

The flow rate control device 100 of the present embodiment can perform the flow rate control by the method described below, also when the flow rate step-down is performed.

Figure 2:
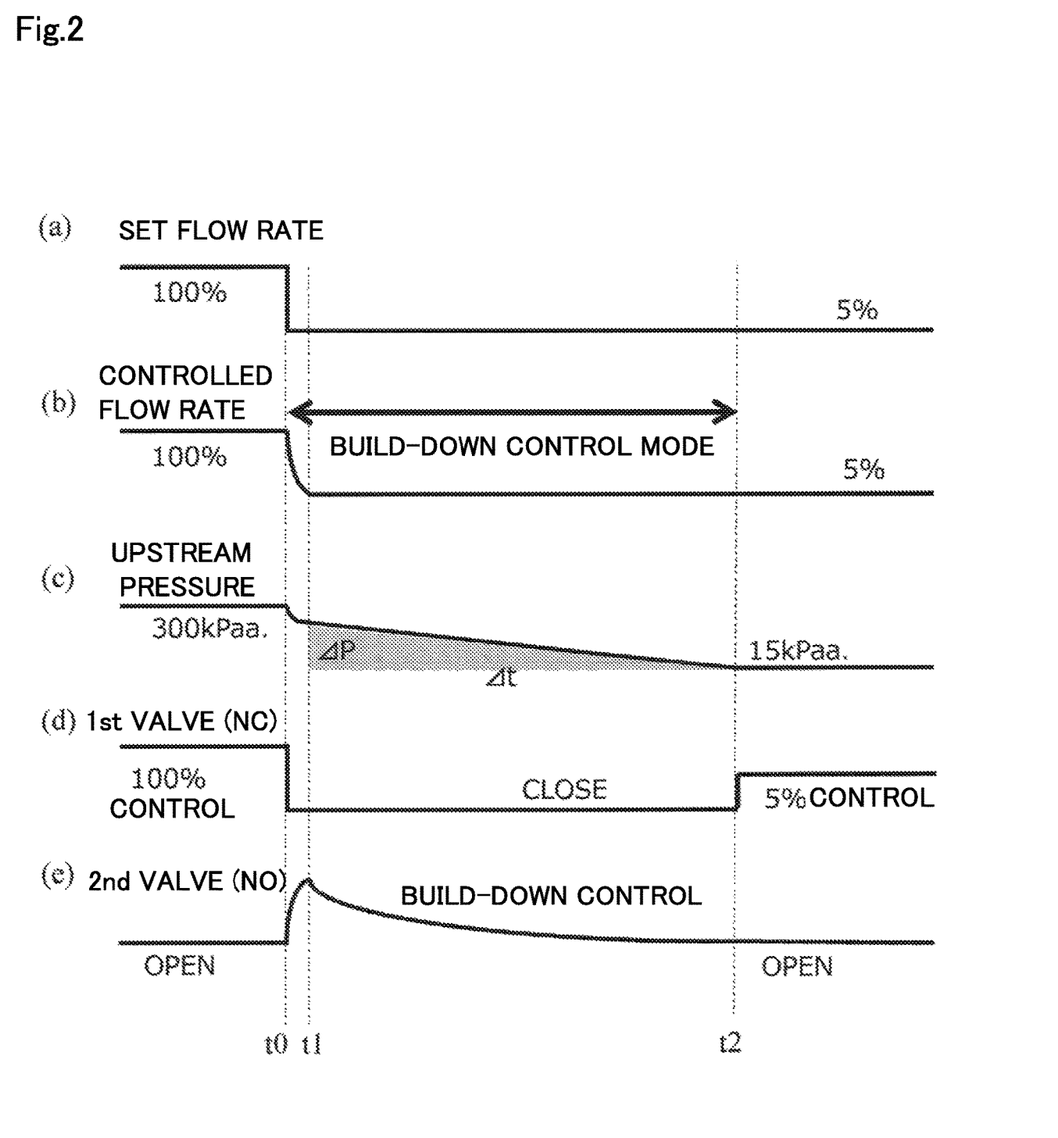
FIG. 2 is a diagram for explaining a flow rate control method at the time of flow rate step-down according to an embodiment of the present invention, (a) is a set flow rate, (b) is a controlled flow rate, (c) is an upstream pressure P1, (d) is a drive voltage of the first control valve, (e) is the drive voltage of the second control valve.

FIG. 2 is a graph showing each of the (a) set flow rate (b) control flow rate, (c) upstream pressure P1, (d) drive voltage of the first control valve 6 (described as the first valve), (e) drive voltage of the second control valve 8 (described as the second valve), when performing step-down by the flow control method of the present embodiment. FIG. 2 shows an example of the set flow rate stepping down from 100% to 5%. However, there is no need to say that the set flow rate at the start of the step-down and the target set flow rate after the step-down may be arbitrary. The flow rate control method of the present embodiment is suitably implemented in any mode that the flow rate is reduced from a first set flow rate to a second set flow rate smaller than the first set flow rate.

Hereinafter, all the flow rate values of the set flow rate, the target flow rate, and the like, are expressed by a ratio in which a predetermined flow rate value is set to 100%. Further, when the critical expansion condition is satisfied, taking into account that the flow rate and the upstream pressure P1 is proportional, the upstream pressure may also be expressed as a ratio 100% when the flow rate value is 100%.

Further, FIGS. 2 (*d*) and (*e*) shows the drive voltage when the first control valve 6 is normally closed (NC) type, and the second control valve 8 is normally open (NO) type. The lower the drive voltage is, the smaller the valve opening of the first control valve 6, and it is completely closed (CLOSE) when the drive voltage is 0 (voltage not applied). On the other hand, the higher the drive voltage is, the smaller the valve opening of the second control valve 8, and it is fully opened (OPEN) when the drive voltage is 0 (voltage not applied).

First, if the set flow rate before the start of the step-down is 100% flow rate, the opening degree of the first control valve 6 is adjusted to the opening corresponding to the 100% flow rate based on the output of the first pressure sensor 3. At this time, the second control valve 8 is kept sufficiently open, and is typically opened to full OPEN. In this state, the fluid can flow downstream through the restriction part 2 and the second control valve 8 at 100% flow rate. When the gas is flowing at 100% flow rate, the value of the upstream pressure P1 is maintained at 300 kPa abs in this embodiment.

Next, FIG. 2 shows the step-down starting from the state of flowing fluid at 100% flow rate to 5% flow rate at time t0. In this case, at time t0, as shown in FIG. 2(*d*), the first control valve 6 is closed smaller than the opening degree corresponding to 5% flow rate. In the present embodiment, the first control valve 6 (CLOSE) is completely closed. If a normally closed valve is used as the first control valve 6, the first control valve 6 can be fully closed by changing the drive voltage to 0. As the control, the set flow rate zero signal may be input to the first control valve 6.

Further, at time t0, in conjunction with the operation of closing the first control valve 6, as shown in FIG. 2(*e*), the operation of adjusting the opening degree of the second control valve 8 is started, so that the gas flows at 5% flow rate downstream of the second control valve 8. The opening degree of the second control valve 8 is typically reduced to an opening smaller than the opening area of the restriction part 2 at time t1, which exhibits a maximally restricted state.

Thus, in the present embodiment, after the start of the flow rate step-down, while the first control valve 6 is fully closed, the second control valve 8 is typically closed to an opening smaller than the opening area of the restriction part 2. Since the first control valve 6 is rapidly closed at time t0, as compared with the case of gradually restricting the first control valve 6 until it reaches the upstream pressure P1 corresponding to 5% flow rate as in the prior art, the upstream pressure P1 and the control flow rate decrease rapidly. Then, at the same time, the second control valve 8 is restricted to a sufficiently small opening (typically smaller than the opening area of the restriction part 2), it becomes a state where the flow rate downstream of the second control valve 8 can be controlled by adjusting the opening of the second control valve 8. In this state, there is no inflow of gas from the upstream side through the first control valve 6, the residual gas between the first control valve 6 and the restriction part 2, and more particularly, the residual gas between the first control valve 6 and the second control valve 8 flows out through the second control valve 8.

When the opening adjustment of the second control valve 8 is not performed, the pressure of the residual gas will continue to decrease exponentially with the outflow time. Therefore, after the time t0, the second control valve 8 performs opening adjustment so that the fluid flowing through downstream of the second control valve 8 can flow at 5% flow rate.

More specifically, in order to maintain the flow rate of the gas flowing downstream of the second control valve 8 constant at 5% flow rate, in the present embodiment, at time t0, based on the output by the first pressure sensor 3, in order to match $\Delta P/\Delta t$ to the value corresponding to the 5% setting, it can be switched to the build-down control mode for feedback control of the second control valve 8. Here, $\Delta P/\Delta t$ is the ratio of the change $\Delta P$ of the upstream pressure P1 output from the first pressure sensor 3, and the time $\Delta t$ required for the change $\Delta P$ of the upstream pressure P1, it corresponds to the slope of the pressure change rate or pressure drop of the upstream pressure P1 with respect to time t.

This is because, in a state where the first control valve 6 is closed, the flow rate Q of the gas flowing downstream of the second control valve 8 can be expressed as $Q=\alpha \cdot (\Delta P/\Delta t) \cdot V$ (where $\alpha$ is a proportionality constant, V is the internal volume between the first control valve 6 and the second control valve 8), and if $\Delta P/\Delta t$ is constant, the flow rate downstream of the second control valve 8 is also maintained at constant. When the second control valve 8 and the restriction part 2 are integrally provided in the form of a valve with a built-in orifice as described above, the internal volume V can be regarded as equivalent to the volume of the flow path from the first control valve 6 to the restriction part 2. The internal volume V can be obtained in advance from such as the diameter of the downstream side flow path of the first control valve 6. It is also possible to determine the internal volume V by calculation using the so-called pressure increase rate method, i.e. from a state of maintaining the downstream side in the vacuum pressure by closing the first control valve 6, to close the second control valve 8 while opening the first control valve 6, to measure the pressure increase rate when flowing gas at a known reference flow rate in the space of the volume V (e.g. disclosed in Patent Document 4).

The so called build-down method (for example, disclosed in Patent Document 5), in which the flow rate Q is obtained based on the measurement of $\Delta P/\Delta t$ as described above, is typically a method of obtaining the flow rate Q by measuring $\Delta P/\Delta t$ after closing the upstream valve in a state where the downstream side is maintained at a low pressure such as a vacuum pressure. More specifically, for example, as described in Patent Document 5, the flow rate can be obtained by $Q=(1000/760) \times 60 \times (273/(273+T)) \times V \times (\Delta P/\Delta t)$. Where T is the gas temperature (° C.), V is the internal volume (l), $\Delta P$ is the magnitude (absolute value) (Torr) of the pressure drop, and $\Delta t$ is the time (sec) required for the pressure drop of $\Delta P$.

Also in the present embodiment, $\Delta P/\Delta t$ corresponding to the desired flow rate based on the build-down method (i.e., the target flow rate after the step-down, here 5% flow rate) is determined, in order to maintain the $\Delta P/\Delta t$, by performing the opening degree adjustment of the second control valve 8 by feedback control based on the output from the first pressure sensor 3, it is possible to continue to flow the residual gas downstream of the second control valve 8 at a desired constant flow rate. In addition, since the flow rate also fluctuates due to the gas temperature T as can be seen from the above equation, by performing the control of $\Delta P/\Delta t$ using the output of the temperature sensor 5 for measuring the gas temperature T, it is possible to perform the flow rate control with more improved accuracy.

When applying the build-down style flow rate control described above to the second control valve 8, immediately after closing the first control valve 6 at time t0, since the change rate $\Delta P1/\Delta t$ of the upstream pressure P1 (the slope in the graph of the upstream pressure P1 shown in FIG. 2 (*c*)) is greater than the pressure change rate $\Delta P1/\Delta t$ corresponding to the desired flow rate, the opening degree of the second control valve 8 is restricted. Thereafter, while the second control valve 8 is sufficiently restricted, the change rate of the upstream pressure P1 gradually decreases. Then, at time t1, when the opening degree of the second control valve 8 is restricted until the change rate $\Delta P1/\Delta t$ obtained by measurement reaches the change rate $\Delta P1/\Delta t$ corresponding to the 5% flow rate, the second control valve 8 is in a state of being restricted to the maximum, the control flow rate is also reduced to the 5% flow rate.

Further, even after the time t1 when the second control valve 8 is restricted to the maximum to reach the opening corresponding to the 5% flow rate as described above, the control of maintaining the $\Delta P1/\Delta t$ at a constant value is continuously performed, but this time, the opening degree of the second control valve 8 is gradually opened. This is because if the opening of the second control valve 8 remains constant, the flow rate decreases with the decrease in the pressure of the residual gas, in order to maintain the $\Delta P1/\Delta t$, i.e., the flow rate at a constant value, it is necessary to continue to open the opening degree of the second control valve 8. Even in this period, while maintaining the first control valve 6 in the closed state, the opening degree of the second control valve 8 is adjusted by the feedback control, so that $\Delta P1/\Delta t$ can be maintained at a constant value based on the output from the first pressure sensor 3.

Thereafter, while the opening degree of the second control valve 8 is continuously adjusted by the build-down style flow rate control, so that $\Delta P/\Delta t$ becomes a desired value, the residual gas flows out at a constant flow rate with the decrease in the upstream pressure P1. Then, set the time when the output value of the first pressure sensor 3 decreases to the upstream pressure (here 15 kPa abs) corresponding to the 5% flow rate in the normal flow rate control mode using the first control valve 6 as time t2, in the present embodiment, at time t2, the first control valve 6 is opened to the opening degree corresponding to the 5% flow rate (the opening degree at the time when the pressure of the internal volume from the first control valve 6 to the restriction part 2 is controlled to 15 kPa abs). Thus, the gas flows from the upstream of the first control valve 6, and can continue to flow at the 5% flow rate thereafter downstream of the first control valve 6 and the second control valve 8. In addition, after the time t2, the second control valve 8 is typically maintained in a state of being fully opened, when the second control valve 8 is normally open type, just keep it fully open (OPEN) and apply 0 drive voltage (voltage not applied).

As described above, in the present embodiment, the flow rate control based on the measurement result of $\Delta P/\Delta t$ using the second control valve 8 (build-down flow rate control) is possible, the operation of switching from the normal flow rate control mode by adjusting the opening degree of the first control valve 6, to the build-down flow rate control mode at the time of the flow rate step-down, and switching back to the normal flow control mode again is performed.

However, in another embodiment, after the normal flow rate control mode, when starting the flow rate step-down, it is possible to first perform control to rapidly restrict the second control valve 8 to a predetermined opening degree, then switch to the builddown flow control mode. This may further improve the responsiveness of the flow rate step-down. By referring to the upstream pressure P1, the first rapid-restricting control of the second control valve 8 may be performed until the upstream pressure P1 reaches a predetermined pressure.

In the above example, if the initial pressure is high as when the flow rate steps down from the 100% flow rate to the 5% flow rate, the moving distance of the valve element for reducing the opening degree of the second control valve 8 to the opening degree corresponding to the 5% flow rate increases. Therefore, for example, it is possible to previously close the opening degree of the second control valve 8 at once to about an opening slightly greater than the opening degree of the orifice, then to reduce the opening degree to an opening corresponding to the 5% flow rate therefrom. Alternatively, by setting the maximum opening degree of the second control valve 8 to an opening degree slightly greater than the orifice opening degree, it is possible to quickly close the second control valve 8 to an opening corresponding to the 5% flow rate.

When the operation of restricting the second control valve 8 is performed before the feedback control as described above, a table showing the association between the remaining upstream pressure P1 and the opening degree corresponding to the flow rate to be controlled may be stored in advance in a storage device or the like, and the operation of the second control valve 8 may be controlled using this table. In the case of using the table, when switching to the build-down control mode, rather than feedback control based on the upstream pressure P1 output from the pressure sensor and the set flow rate after the step-down (5% flow rate), it is possible to first make the opening degree of the second control valve 8 close to the vicinity of the opening degree according to the table, then perform feedback control therefrom.

As items stored in the above table, a plurality of parameters such as gas type, residual pressure, control pressure, and the like, are conceivable. In this case, a table corresponding to each parameter may be prepared, or a reference table may be prepared, and, for example, when the gas type is different, a correction coefficient corresponding to the gas type may be provided to cover the difference of the gas type, and the reference table may be corrected and used. Alternatively, even when the reference table is used without correction, since the second control valve 8 can be brought close to the desired opening degree to some extent, the control load can be reduced while improving the responsiveness of the second control valve 8.

According to the flow rate control method of the present embodiment described above, as shown in FIG. 2 (*b*), it is possible to rapidly reduce the flow rate in a short period of time from t0 to t1, and to step down the flow rate to a low set flow rate in a short time. Further, thereafter, by adjusting the opening degree of the second control valve 8, it is possible to continue to flow the gas stably at the flow rate after the step-down. Furthermore, after the residual gas dropped to a predetermined pressure, by opening the first control valve 6, it is possible to continue to flow the gas at a low set flow rate. Thus, it is possible to appropriately perform the switching to the low set flow rate while significantly improving the responsiveness at the time of step-down.

According to the present embodiment, when using the an orifice having a diameter of 85 μm as the restriction part, it is possible to shorten the time for decreasing from 100% flow rate (200 sccm) to 5% flow rate (10 sccm) to 1 second or less, for example, to about 100 milliseconds. The above-mentioned time periods can be shortened as the closing speed of the second control valve 8 is increased. It should be noted that the dimension and flow rate described above are merely an example, and the flow rate may vary with different orifice diameters and pressures, of course the flow rates may vary even with the same orifice or pressure.

In the present embodiment, the second control valve 8 is in the most restricted state at the time t1, but is not completely closed at this time, and the gas can flow at the target flow rate after the step-down. Therefore, it is possible to continuously supply the gas to the downstream side of the second control valve 8 without interruption while realizing a desired flow rate transition from before the step-down to after the step-down, and gas supply can be performed stably.

In the embodiment described above, as shown in FIGS. 2 (d) and (e), the timing of closing the first control valve 6 is matched and synchronized with the timing of starting to reduce the opening of the second control valve 8. In this case, after the gas flowing in from the upstream of the first control valve 6 is shut off at time to, the residual gas between the first control valve 6 and the second control valve 8 flows out at a flow rate corresponding to the opening degree of the second control valve 8 through the restriction part 2 and the second control valve 8.

However, the timing of closing the first control valve 6 and the timing of starting the opening adjustment of the second control valve 8 may not be necessarily matched, if sufficiently shorter time than the transient response time from 100% flow rate to 5% flow rate, these may be shifted.

In the embodiment to reduce the opening degree of the second control valve 8 after a predetermined time has elapsed from closing the first control valve 6, the control flow rate exponentially naturally decreases during the period of the second control valve 8 remains fully open. However, If start the adjustment of the opening degree of the second control valve 8 before reaching the target flow rate, and achieve a state capable of controlling the flow rate by adjusting the opening degree of the second control valve 8, then the flow rate can be controlled to the target flow rate by performing the opening degree adjustment of the second control valve 8 afterwards. Further, even when starting to close the second control valve 8 before closing the first control valve 6, although there is a possibility that the upstream pressure P1 increases temporarily, after the first control valve 6 is closed, it is possible to perform the flow control by the opening degree adjustment of the second control valve 8.

In this manner, as long as the timing of closing the first control valve 6 and the timing of starting the opening adjustment of the second control valve 8 can improve the responsiveness at the time of step-down as compared with the prior art, they may be synchronized as described above, or deviated. As a specification including the mode of time shifting as described above, the present specification is sometimes describes that the operation of starting the adjustment of the opening degree of the second control valve 8 is performed in conjunction with the operation of closing the first control valve 6.

Hereinafter, an exemplary flow chart of the flow rate control method of the present embodiment will be described with reference to FIG. 3.

Figure 3:
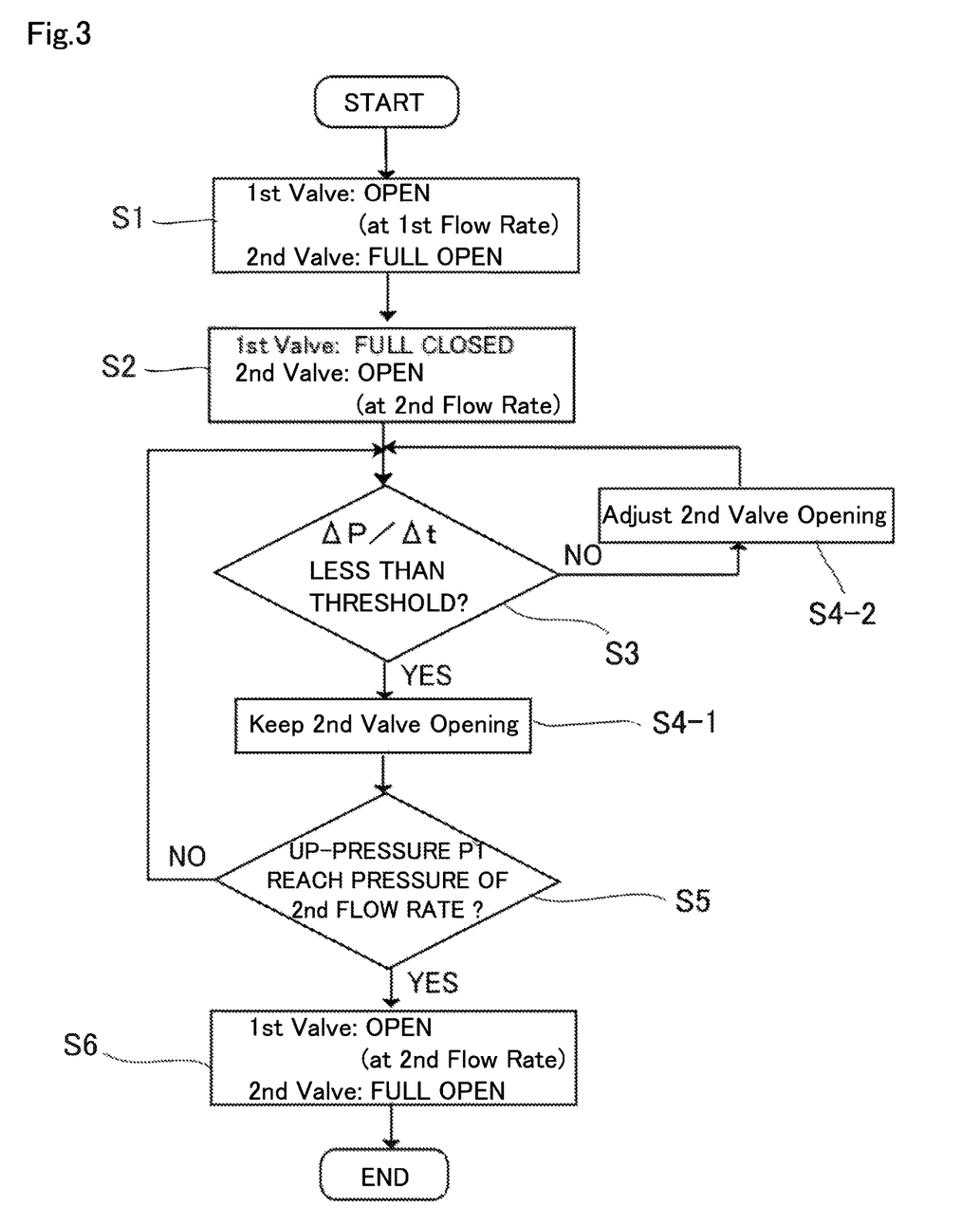
FIG. 3 is a flowchart showing a flow rate control method according to an embodiment of the present invention.

As shown in step S1 of FIG. 3, gas can flow at the first flow rate with the fully opened second control valve 8 (i.e., the second valve) by feedback controlling the first control valve 6 (i.e., the first valve) based on the output of the first pressure sensor 3.

Next, as shown in step S2, when receiving a signal for decreasing the set flow rate from the first flow rate to the second flow rate, the control circuit 7 issues a command for fully closing the first control valve 6, and issues a command for controlling the second control valve 8 to an opening degree corresponding to the second flow rate, thereby switching to the build-down flow rate control mode.

In the build-down flow rate control mode, as shown in steps S3, S4-1 and S4-2, in a state where the first control valve 6 is fully closed, as ΔP/Δt is maintained at a value corresponding to the second flow rate, the opening degree of the second control valve 8 is feedback controlled based on the output of the first pressure sensor 3. More specifically, in step S3, the measurement result of ΔP/Δt is compared with a target value, and when the comparison result is within the threshold value, the driving voltage of the second control valve 8 is maintained in step S4-1, and when the comparison result is outside of the threshold value, the driving voltage of the second control valve 8 is changed in step S4-2.

Further, as shown in step S5, by monitoring the output of the first pressure sensor 3, it is determined whether the upstream pressure P1, which is the output of the first pressure sensor 3, has reached a predetermined value. If not, the process returns to step S3 or the build down control mode, in which the control of the second control valve 8 is continued to flow the gas at the second flow rate.

In step S5, when the output of the first pressure sensor 3 is determined to have reached a predetermined value, the control mode switches, as shown in step S6, and the second control valve 8 is fully opened while the first control valve 6 is opened to the opening degree corresponding to the second flow rate. Thus, it is switched to the ordinary flow rate control mode. Thereafter, the opening degree of the first control valve 6 is feedback controlled based on the output of the first pressure sensor 3 to enable flowing the gas at the second flow rate continuously.

While embodiments of the present invention have been described above, various modifications are possible. For example, in the above description, the first control valve 6 is completely closed to be in the shut-off state at the start of the step-down, but the present invention is not limited thereto. Even in the build down control mode after the step-down starts, the opening degree of the first control valve 6 may be maintained in a constant slightly opened state, a state in which the gas flows in at a flow rate less than the target flow rate may be continued. Also in this case, based on the output of the first pressure sensor 3, if the opening degree of the second control valve 8 is adjusted so that ΔP/Δt can be maintain at a predetermined value, the fluid can be flowed downstream of the second control valve 8 at a target flow rate.

However, since the flow rate equation used in the build down method, typically, is a formula assuming that the upstream valve (first control valve 6) is closed, in a state where the upstream side is open and the fluid flows to the portion of the volume V, the flow control may not be properly performed if using the flow equation as it is. However, if the flow rate flowing into the volume V from the upstream side is known, it is conceivable that the flow rate equation can be corrected and used. Therefore, when the inflow amount is known, substantially it can be considered as the same situation that the upstream valve is closed.

Further, an example has been described above in which the set flow rate is set as 100% at the time when the first control valve 6 is fully opened, but it is not necessarily to do so, the flow rate may also be set as 100% in a state where the opening degree is intermediate but not fully opened. Then, in the above embodiment, the upstream pressure P1 at the set flow rate 100% is set as 300 kPa abs, but it is not limited thereto, there is no need to say that the upstream pressure P1 may be a variety of values, depending on the set flow rate, the flow rate range, the type of fluid, or the like.

INDUSTRIAL APPLICABILITY

The flow rate control method and the flow rate control device according to the embodiment of the present invention can be suitably used when a high-speed responsiveness is required at the time of flow rate step-down in a semiconductor manufacturing process.

DESCRIPTION OF NUMERICALS

1 Flow path
2 Restriction part
3 First pressure sensor
4 Second pressure sensor
5 Temperature sensor
6 First control valve
7 Control circuit
8 Second control valve
9 Valve with built-in orifice
100 Pressure type flow rate control device

The invention claimed is:

1. A flow rate control method using a flow rate control device including:
a first control valve provided in a flow path;
a second control valve provided downstream of the first control valve; and
a pressure sensor for measuring a fluid pressure downstream of the first control valve and upstream of the second control valve,
the flow rate control device being configured to control a flow rate of the fluid flowing downstream of the second control valve by controlling an opening degree of the first control valve based on a signal output from the pressure sensor,
the flow rate control method comprising steps of:
(a) from a state in which a fluid flows at the first flow rate by controlling the opening degree of the first control valve so as to correspond to the first flow rate based on an output of the pressure sensor and maintaining the second control valve in an opening state, closing the opening degree of the first control valve; and
(b) based on the output of the pressure sensor, controlling the pressure remaining downstream of the first control valve, by adjusting the opening degree of the second control valve, and flowing the fluid at a second flow rate downstream of the second control valve.

2. The flow rate control method according to claim 1, wherein in the step (b), when α is a proportional constant, $\Delta P/\Delta t$ is a pressure change rate of the upstream pressure change $\Delta P$ obtained from output of the pressure sensor with respect to the time $\Delta t$ required for the upstream pressure change $\Delta P$, V is an internal volume between the first control valve and the second control valve, in order to match a builddown flow rate Q represented by $$Q=\alpha\cdot(\Delta P/\Delta t)\cdot V$$

to the second flow rate, the opening degree of the second control valve is feedback controlled based on the signal output from the pressure sensor.

3. The flow rate control method according to claim 1, further comprising a step (c), after performing the step (b), of flowing the fluid downstream at the second flow rate by controlling the opening degree of the first control valve based on the output of the pressure sensor at the time when the output of the pressure sensor decreases to a predetermined value.

4. The flow rate control method according to claim 3, wherein, the second control valve is fully opened during the period of flowing the fluid at the first flow rate in the step (a), and when flowing the fluid at the second flow rate by controlling the opening degree of the first control valve in step (c).

5. The flow rate control method according to claim 1, wherein, in the step (a), the first control valve is closed to an opening degree smaller than the opening degree when controlling the opening degree of the first control valve so as to correspond to the second flow rate based on the output of the pressure sensor.

6. The flow rate control method according to claim 1, wherein the timing of closing the first control valve in the step (a) and the timing of starting the adjustment of the opening degree of the second control valve in the step (b) are synchronized.

7. A flow rate control device comprising:
a first control valve provided in a flow path;
a second control valve provided downstream of the first control valve;
a pressure sensor for measuring a fluid pressure downstream of the first control valve and upstream of the second control valve; and
a control circuit for controlling an operation of the first control valve and the second control valve, the control circuit being configured to control a flow rate by controlling the first control valve based on a signal output by the pressure sensor, and performing steps of:
(a) from a state in which a fluid flows at a first flow rate by controlling the opening degree of the first control valve so as to correspond to the first flow rate based on an output of the pressure sensor and maintaining the second control valve in an opening state, closing the opening degree of the first control valve; and
(b) based on the output of the pressure sensor, controlling the pressure remaining downstream of the first control valve, by adjusting the opening degree of the second control valve, and flowing the fluid at a second flow rate downstream of the second control valve.

8. The flow rate control device of claim 7, wherein the second control valve is a normally open valve.

9. The flow rate control device according to claim 7, further comprising another pressure sensor provided downstream of the second control valve.

10. A flow rate control device comprising:
a first control valve provided in a flow path;
a second control valve provided downstream of the first control valve; and
a pressure sensor for measuring a fluid pressure downstream of the first control valve and upstream of the second control valve,
the flow rate control device being configured to control a flow rate of a fluid flowing downstream of the second control valve based on a signal output from the pressure sensor,
wherein when controlling the flow rate from a first flow rate to a second flow rate smaller than the first flow rate, the first control valve is closed and the opening degree of the second control valve is controlled based on the output of the pressure sensor, and
the opening degree of the second control valve is controlled so as to match the change rate of the pressure remaining downstream of the first control valve to the change rate when the flow rate flowing out from the second control valve becomes the second flow rate.

11. The flow control device of claim 10, wherein the first control valve is controlled to an opening degree smaller than an opening degree corresponding to the second flow rate, when controlling a flow rate from the first flow rate to the second flow rate.

12. The flow rate control device according to claim 10, wherein the opening degree of the second control valve is controlled to the opening degree capable of maintaining $\Delta P/\Delta t$ when a flow rate Q represented by $$Q=\alpha\cdot(\Delta P/\Delta t)\cdot V$$

becomes the second flow rate, where $\alpha$ is a proportional constant, $\Delta P/\Delta t$ is a pressure change rate of the upstream pressure change $\Delta P$ obtained from output of the pressure sensor with respect to the time $\Delta t$ required for the upstream pressure change $\Delta P$, V is an internal volume between the first control valve and the second control valve.

13. The flow rate control device of claim 10, further comprising another pressure sensor provided downstream of the second control valve.

14. A flow rate control device comprising:
a first control valve provided in a flow path;
a second control valve provided downstream of the first control valve; and
a first pressure sensor for measuring a fluid pressure downstream of the first control valve and upstream of the second control valve, a flow rate control device for controlling a flow rate of the fluid flowing downstream of the second control valve based on a signal output from the first pressure sensor, wherein the flow rate is controlled from a first flow rate to a second flow rate smaller than the first flow rate, from the control of the flow rate by $Q=K_1\cdot P1$, the flow rate is controlled by switching to the control by $Q=\alpha\cdot(\Delta P/\Delta t)\cdot V$,
when the pressure of the first pressure sensor reaches a predetermined pressure, returning to the control by $Q=K_1\cdot P1$, where Q is the flow rate, $K_1$ is a constant depending on the type of the fluid and the fluid temperature, P1 is the upstream pressure output by the first pressure sensor, $\alpha$ is a proportional constant, $\Delta P/\Delta t$ is a pressure change rate of the upstream pressure, V is the internal volume between the first control valve and the second control valve.

15. The flow control device according to claim 14, wherein the pressure of the first pressure sensor, in the control by $Q=K_1\cdot P1$, returns the control at the time of reaching the pressure corresponding to the second flow rate.

16. A flow rate control device comprising:
a first control valve provided in a flow path;
a second control valve provided downstream of the first control valve;
a first pressure sensor for measuring a fluid pressure downstream of the first control valve and upstream of the second control valve; and
a second pressure sensor for measuring the fluid pressure downstream of the second control valve,
the flow rate control device controlling a flow rate of the fluid flowing downstream of the second control valve based on signals output from the first and second pressure sensors, wherein,
when controlling the flow rate from the first flow rate to a second flow rate smaller than the first flow rate,
the flow rate is controlled by switching from the control of the flow rate by $Q=K_2\cdot P2^m(P1-P2)^n$, to the control by $$Q=\alpha\cdot(\Delta P/\Delta t)\cdot V,$$

when the pressures of the first and second pressure sensors reach predetermined pressures, returning to the control by $Q=K_2\cdot P2^m(P1-P2)^n$, where Q is the flow rate, $K_2$ is a constant depending on the type of the fluid and the fluid temperature, P1 is the upstream pressure output by the first pressure sensor, P2 is the downstream pressure output by the second pressure sensor, m and n are exponents derived from the actual flow rate, $\alpha$ is a proportionality constant, $\Delta P/\Delta t$ is the rate of a pressure change of the upstream pressure and V is the internal volume between the first control valve and the second control valve.

17. The flow rate control device according to claim 16, wherein at the time when the pressures of the first and second pressure sensors in the control by $$Q=K_2\cdot P2^m(P1-P2)^n$$

reach to the pressure corresponding to the second flow rate, returning the control.

* * * * *